US006948911B1

(12) United States Patent
Laughton

(10) Patent No.: US 6,948,911 B1
(45) Date of Patent: Sep. 27, 2005

(54) WATER TORQUE CONVERTER

(76) Inventor: Ronald B. Laughton, 705 Covewood St., Oak Park, CA (US) 91377

( * ) Notice: Subject to any disclaimer, the term of this patent is extended or adjusted under 35 U.S.C. 154(b) by 249 days.

(21) Appl. No.: 10/407,724

(22) Filed: Apr. 4, 2003

(51) Int. Cl.[7] .......... F03B 9/00; F03B 13/12

(52) U.S. Cl. .......... 416/6; 416/7; 416/64; 415/5; 290/53

(58) Field of Search .......... 416/64, 66, 6, 416/7, DIG. 4; 415/5; 290/42, 53

(56) References Cited

U.S. PATENT DOCUMENTS

| | | | |
|---|---|---|---|
| 583,689 A | 6/1897 | McDonald | |
| 675,039 A | 5/1901 | Graff | |
| 692,396 A | 2/1902 | Wilcox | |
| 875,850 A | 1/1908 | Rowe | |
| 986,740 A | 3/1911 | Mobius | |
| 1,096,332 A * | 5/1914 | Warden | 416/6 |
| 3,668,412 A * | 6/1972 | Vrana et al. | 290/53 |
| 4,002,416 A | 1/1977 | Axford | |
| 4,170,738 A | 10/1979 | Smith | |
| 4,371,788 A | 2/1983 | Smith, Jr. | |
| 4,539,484 A | 9/1985 | Suggs | |

* cited by examiner

*Primary Examiner*—Edward K. Look
*Assistant Examiner*—Richard A. Edgar
(74) *Attorney, Agent, or Firm*—Jack C. Munro

(57) ABSTRACT

A water torque converter for extracting energy from the reciprocal motion of water beneath waves in a body of water comprising an open frame on which is mounted a rigid sail. The rigid sail is guidingly moved from one end of the frame to the opposite end of the frame by the reciprocal motion of the water. An elongated driving member is connected through a multi-clutch mechanism to the sail. This elongated driving member is also connected to an output shaft. The reciprocal movement of the sail results in the output shaft to be rotationally driven in one direction.

11 Claims, 3 Drawing Sheets

WATER TORQUE CONVERTER

BACKGROUND OF THE INVENTION

1. Field of the Invention

A water torque converter for extracting both kinetic energy from the reciprocal motion of water beneath waves in a body of water which is to result in the rotation of an output shaft which can be utilized to operate a power device, such as an electric generator or pump. The use of water movement in a body of water is a non-polluting energy source and does not deplete any natural resources.

2. Description of the Related Art

The movement of a wave within water produces kinetic energy in the movement of a wave toward the shoreline and also potential energy in the fact that the surface of the water raises and lowers. Scientists estimate that ocean waves generate anywhere from 10–60 Kw per meter of shoreline. Wave energy is an abundantly clean energy resource. Clean is defined as being friendly toward the environment. Current energy technology seemed to be plagued with environmental problems. Using coal as an energy source produces harmful carbon emissions and other pollutants. Nuclear energy creates radioactive waste that is difficult to dispose of properly. Petroleum-burning power generators are expensive and create environmental contaminants.

Previously there has been a substantial number of energy producing devices that are directed to extracting potential energy from waves. These devices commonly use a float that floats on the surface of the water and as the surface of the water raises and lowers energy is to be extracted. The main disadvantage of such energy capturing devices is that the potential energy is only a small portion of the total energy that is produced by a water wave.

There have been prior art devices that produce energy by capturing the kinetic energy of waves. However, these devices have been complicated and do not function well enough to produce energy efficiently. Most often, these devices require placement within salt water and must be operative for an extended length of time sustaining low frictional operation. Corrosion, caused by the salt water, causes failure of such devices. Also, the device must be compact in size so as to minimize the appearance of the device so as to not detract from the appearance of the environment.

SUMMARY OF THE INVENTION

The primary objective of the present invention is to construct a torque converter for extracting the kinetic energy from the reciprocal motion of water beneath the waves in a body of water.

Another objective of the present invention is to construct an energy extracting device which requires no fuel input thereby being a clean source of power.

Another objective of the present invention is to construct a torque converter that utilizes the literally infinite energy that is produced by the reciprocal motion of water beneath a wave in a body of water. The reciprocal motion of water is caused by compression and rarefaction of waves.

Another objective of the present invention is to construct the torque converter entirely of non-corrosive materials, such as aluminum, polymers and stainless steel. All bearings comprise plastic sleeves or collars that are constructed to low frictionally support shafts in a corrosive environment, such as salt water.

A first basic embodiment of the present invention utilizes an open frame which has an internal compartment and within this internal compartment is mounted a rigid sail. The rigid sail is designed to be moved linearly by the reciprocal movement of water in a body of water. This frame is to be mounted below the surface of the water, near the shoreline and it will be anchored on the floor of the sea or the lake. The water is to push against the front surface of the sail causing this sail to move in one lineal direction and when the water pushes against the opposite surface of the sail the sail moves in the opposite lineal direction. The sail is maintained in a transverse relationship relative to this lineal movement by a guide structure. An elongated driving member is connected to the sail and is also connected to an output shaft. As the sail is moved along its path of movement, the driving member causes rotation of this output shaft. The rigid sail is substantially planar on both the front surface and the rear surface of the sail with there being a peripheral raised edge also on the front surface and the rear surface.

A second basic embodiment of the present invention utilizes an open frame which has an internal compartment and within this internal compartment is mounted a rigid sail. The rigid sail is designed to be moved linearly by the reciprocal movement of water in a body of water. This frame is to be mounted below the surface of the water, near the shoreline and it will be anchored on the floor of the sea or the lake. The water is to push against the front surface of the sail causing the sail to move in one lineal direction, and when the water pushes against the opposite surface of the sail, the sail moves in the opposite lineal direction. The sail is maintained in a transverse relationship relative to this lineal movement by a guide structure. An elongated driving member is connected to the sail and is also connected to an output shaft. As the sail is moved along its path of movement, the driving member causes rotation of this output shaft. There is formed a hole substantially centrally formed within the sail with the elongated driving member being designed to connect with this hole.

A further embodiment of the present invention is where the just previous embodiment is modified by there being included a clutch mechanism in association with the hole formed in the sail.

A third basic embodiment of the present invention utilizes a rigid open frame which has an internal compartment and within this internal compartment is mounted a rigid sail. The rigid sail is designed to be moved linearly by the reciprocal movement of water in a body of water. This frame is to be mounted below the surface of the water, near the shoreline and it will be anchored on the floor of the sea or the lake. The water is to push against the front surface of the sail causing this sail to move in one lineal direction and when the water pushes against the opposite surface of the sail the sail moves in the opposite lineal direction. The sail is maintained in a transverse relationship relative to this lineal movement by a guide structure. An elongated driving member is directed to the sail and is also connected to an output shaft. As the sail is moved along its path movement, the driving member causes rotation of this output shaft. The rigid sail is substantially planar on both its front surface and its rear surface with the exception that both the front surface and the rear surface has a raised peripheral edge.

A further embodiment of the present invention is where the third basic embodiment is modified by defining that the guide means comprises a plurality of spaced apart elongated members on which the sail is mounted.

A further embodiment of the present invention is where the just previous embodiment is modified by defining that the elongated driving member is continuous.

A further embodiment of the present invention is where the just previous embodiment is modified by defining that the elongated driving member comprises a chain.

A further embodiment of the present invention is where the just embodiment is modified by defining that the output shaft is spaced from the frame.

A further embodiment of the present invention is where the just previous embodiment is modified by defining that there is a hole formed through the sail and the elongated driving member connects with the hole with this hole being substantially centrally located within the sail.

A further embodiment of the present invention is where the just previous embodiment is modified by defining that there is a clutch mechanism mounted on the sail with this clutch mechanism connecting with the elongated driving member. The clutch mechanism functions to prevent lineal movement of the elongated driving member in only a single direction.

A further embodiment of the present invention is where the just previous embodiment is modified by there being defined another unit connected to the output shaft with both of these units causing rotation of the output shaft.

BRIEF DESCRIPTION OF THE DRAWINGS

For a better understanding of the present invention, reference is to be made to the accompanying drawings. It is to be understood that the present invention is not limited to the precise arrangement shown in the drawings.

DETAILED DESCRIPTION OF THE INVENTION

Figures 1, 2:
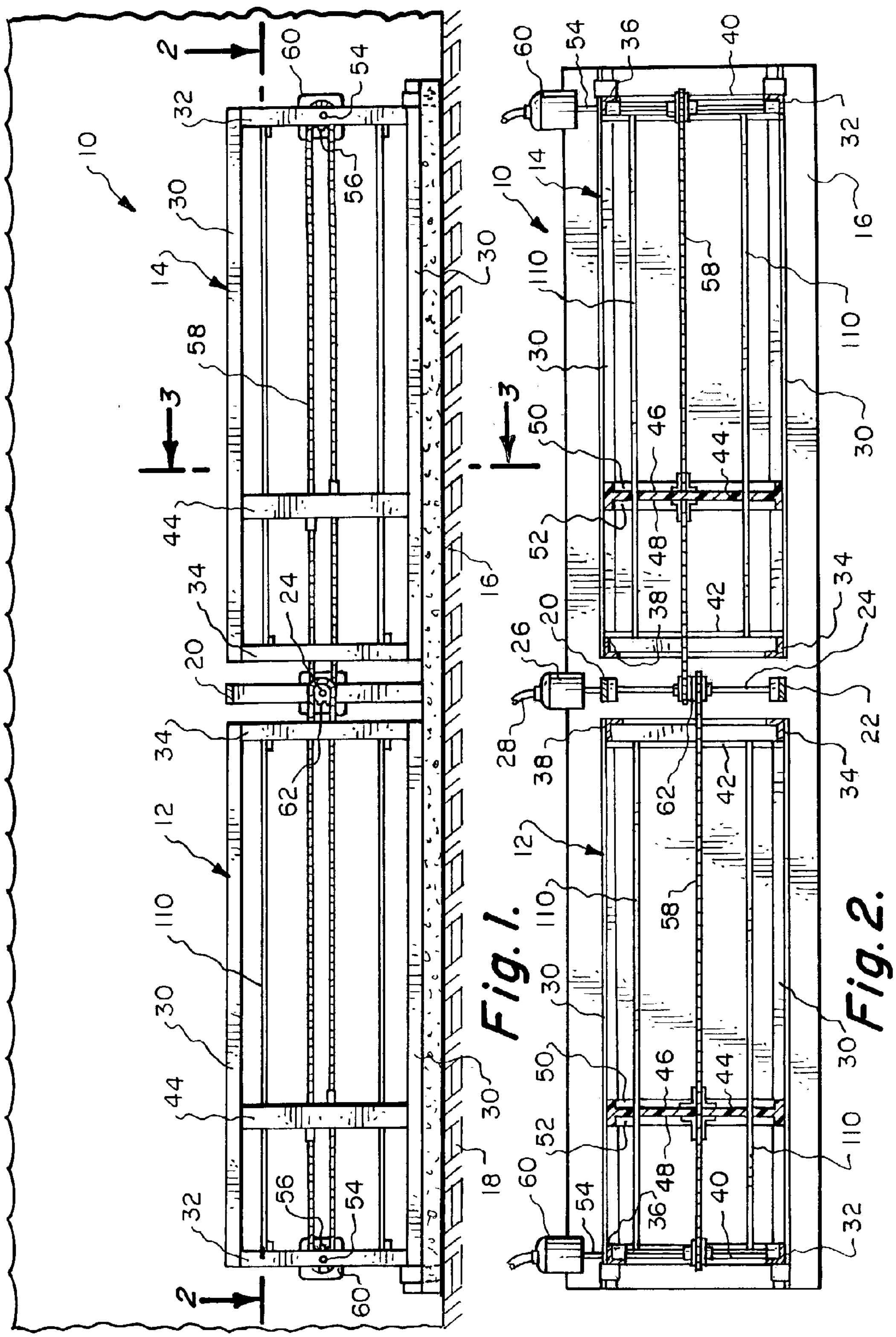
FIG. 1 is a side elevational view of the water torque converter of the present invention where there are utilized two units of the torque converter connected in series in conjunction with a single output shaft.
FIG. 2 is a top plan view, partly in cross-section, taken along line 2—2 of FIG. 1 of the torque converter of the present invention.

Referring particularly to the drawings, there is shown in FIGS. 1 and 2 the torque converter 10 of this invention which is shown to comprise a unit 12 and a unit 14. Units 12 and 14 are basically identical with the only difference being that such are mounted in a facing relationship. The units 12 and 14 may be mounted in direct alignment, as shown in the drawings, or may be mounted in a non-aligned position assuming a staggered relationship. Both the unit 12 and the unit 14 are to be fixedly mounted onto a cement platform 16 which is to be fixedly positioned on the ocean, sea or lake floor 18. However, the lake would have to be of a sufficient size to readily produce a continuous sizable series of waves that break into the shore. Typical such lakes would be the Great Lakes of the United States.

Mounted on the cement platform 16 are a pair of posts 20 and 22. The posts 20 and 22 are located spaced apart and in between the posts 20 and 22 is mounted a shaft 24. The shaft 24 is to be rotatable relative to the posts 20 and 22. One end of the shaft 24 is idly supported by the post 22 while the opposite end of the shaft 24 passes through the post 20 and connects with a motor 26. Typically, there will be located a gear box between the post 20 and the motor 26. This gear box is not shown but is deemed to be conventional. The motor 26 will typically comprise a generator or a pump. Rotation of the output shaft 24 will result in the production of electricity if the motor 26 is a generator. This produced electricity will be siphoned off from the motor 26 by means of an electrical wire 28.

The following description will be applicable primarily to unit 12 with it being understood that this description will also be applicable to unit 14. Unit 12 is constructed of a frame composed of a plurality of longitudinal frame members 30. Typically, the frame members 30 will be located parallel to each other and will be located in a corner arrangement defining an internal compartment within the area defined by the longitudinal frame members 30. The longitudinal frame members 30 are fixedly secured at one end thereof to a side transverse member 32 and at the opposite end thereof are secured to a second side transverse member 34. The remaining two longitudinal frame members 30 at one end thereof are fixedly secured to another side transverse member 36 and at the opposite end of these longitudinal frame members 30 are fixedly secured to another side transverse member 38. The side transverse members 32 and 36 are fixedly secured at opposite ends to a bottom transverse member 40 which is fixedly mounted on the cement platform 16. The one end of the side transverse members 34 and 38 are fixedly mounted to another transverse member 42. The opposite ends of the side transverse members 32 and 36 are fixedly secured to a top transverse member, which is not shown. Also, the opposite end of the side transverse members 34 and 38 are fixedly secured to a top transverse member, which is not shown. These top transverse members are also fixedly secured to a pair of the longitudinal frame members 30. In essence what is formed is an open box that is to permit free passage of water through the box.

Figure 3:
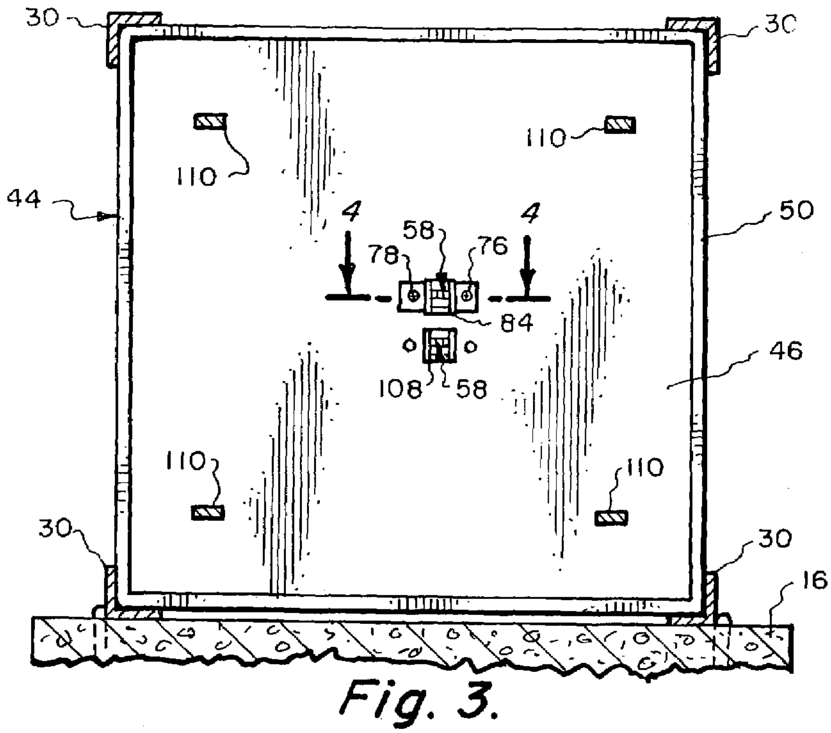
FIG. 3 is a cross-sectional view taken along line 3—3 of FIG. 1 of the torque converter of the present invention showing in more detail the sail that is utilized in conjunction with one of the units of the torque converter.
Figure 4:
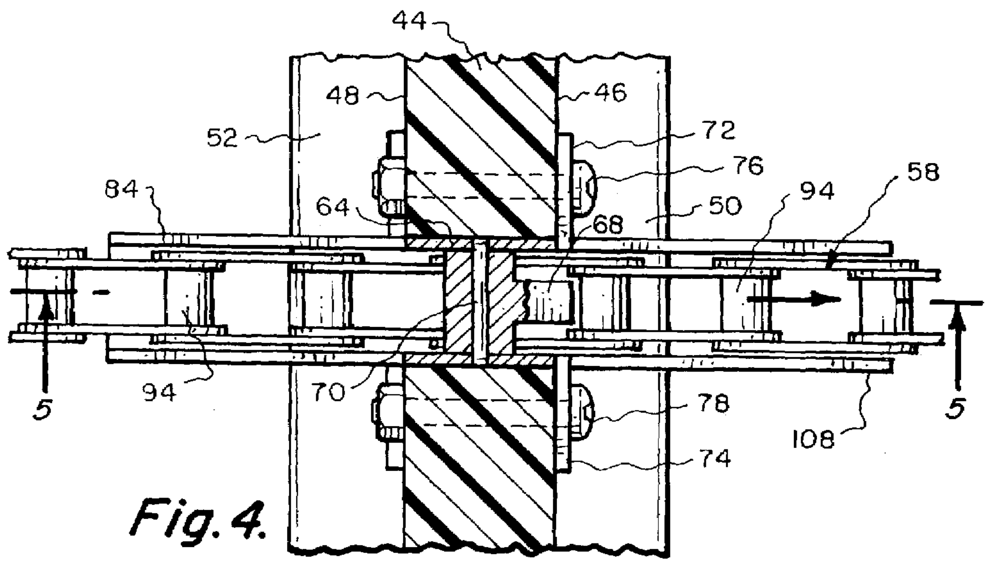
FIG. 4 is a cross-sectional view showing the mounting arrangement for the driving member in conjunction with the sail that is utilized in conjunction with the torque converter of the present invention.

Mounted within the internal chamber formed by the box is a sail 44. The sail 44 is shown in FIG. 3 to give the appearance of being in physical contact with the frame members 30. In actual practice, there will be a slight gap area between each frame member 30 and the sail 44. The sail 44 constitutes a rigid rectangular shaped structure which will usually be formed of plastic. However, aluminum, plastics or other non-corrosive materials could also be used. The sail 44 has a front surface 46 and a rear surface 48. The front surface 46 is surrounded by a raised peripheral edge 50. Typically, the peripheral edge 50 will be about one inch high. The rear surface 48 is enclosed by a similar peripheral edge 52. The function of the peripheral edges 50 and 52 is that when the front surface 46 and the rear surface 48 is pushed by water that the water has a tendency to not slide off of the sail 44 but is intended to be "caught". The action for the sail 44 is similar to a cup. The front surface 46 and the rear surface 48, because of the peripheral edges 50 and 52, function to contain the water so that the maximum energy can be extracted in the movement of the water.

Mounted at one end of the frame of the torque converter unit 12 and 14, which is composed of the members 30 to 42, is a second output shaft 54. The second output shaft 54 is rotationally mounted relative to the side transverse members 32 and 36. This second output shaft 54 includes a sprocket 56. The sprocket 56 is to be operative in engagement with a chain 58. The second output shaft 54 is to be connected to a load, such as a generator 60. The use of the shaft 54 to drive a generator or pump is deemed to be optional in conjunction with this invention. The reason for this is that the chain 58 is also connected to a sprocket 62 which is fixedly mounted on the shaft 24. There are actually two in number of the sprockets 62 fixedly mounted onto the shaft 24 in a spaced apart manner. One of the sprockets 62 connects with one of the chains 58 for unit 12 and the other chain 58 for unit 14. The shaft 24 is to be the main output shaft with the shafts 54 being secondary. It may be that it is only necessary to utilize the shaft 24 and not utilize shafts 54.

Figure 5:
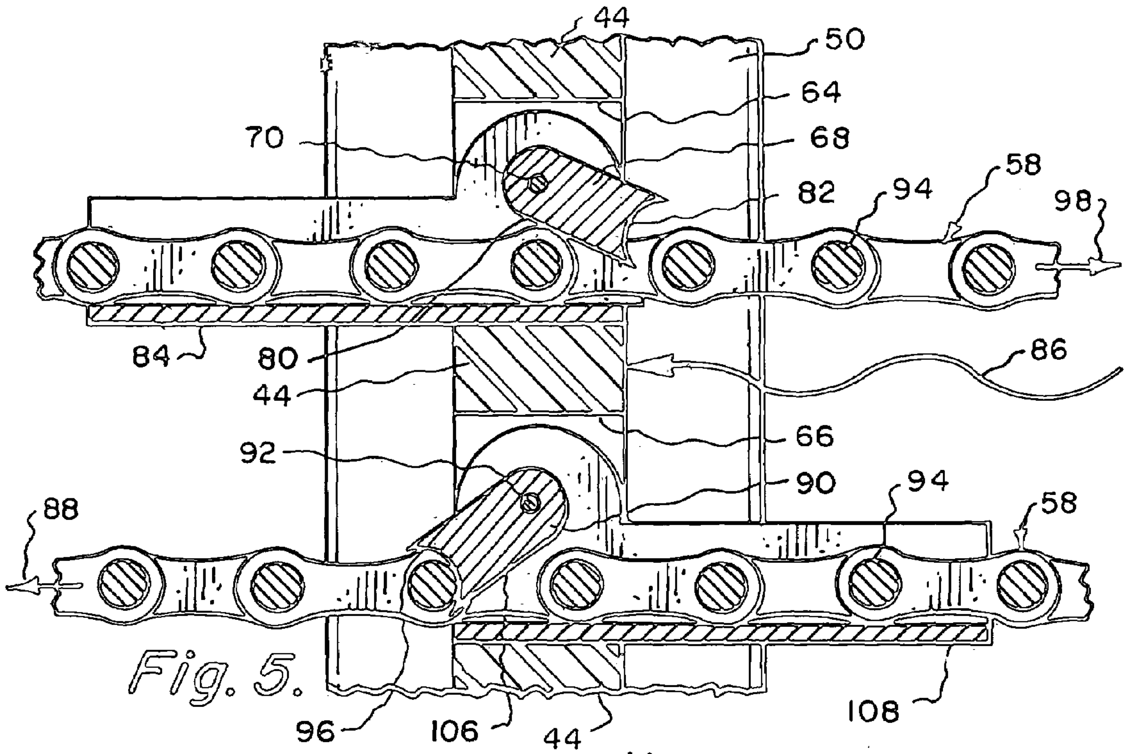
FIG. 5 is a cross-sectional view taken along line 5—5 of FIG. 4 showing the position of the clutch mechanism with the sail being driven in the leftward direction.

Formed within the sail 44 is a pair of holes 64 and 66. These holes 64 and 66 are substantially centrally mounted within the sail 44. To provide clearance between the sprockets 62, the holes 64 and 66 of the sails 44 are slightly offset of center in opposite directions from center. It is desirable to have the chains be as close to the center of the sail 44 to minimize undesirable torque which is defined as yaw. Mounted within the sail 44 and located within the hole 64 is a pawl 68. The pawl 68 is pivotally mounted on a pin 70 which is fixedly secured into holes formed in a pair of brackets 72 and 74. The brackets 72 and 74 are fixedly mounted by conventional bolt fasteners 76 and 78 respectively into the body of the sail 44. The pawl 68 is specifically formed to have a cam surface 80 and a concave engaging surface 82. The chain 58 rests on a guide trough 84 which is fixedly mounted onto the sail 44. The chain 58, when it moves in the direction of arrow 86, will slide relative to the guide trough 88 with the pawl 68 being moved to a disengaged position with the cam surface 80 riding over the different pin-links 94 of the chain 58 essentially replicating a ratcheting action. If the chain 58 moves in the direction of arrows 88 and 98, which is shown in FIG. 5, the pawl 68 will be caused to fall between two of the pin-links 94 of the chain with one of the pin-links 94 of the chain pressing against the engaging surface 82 thereby fixing the chain 58 relative to the sail 44. Therefore, as the sail 44 is moved by water being pressed against the rear surface 48 (arrow 100), the sail 44 will tend to move from one end of the frame to the opposite end of the frame carrying with it the chain 58. This in turn will cause the output shaft 24 to be rotated in a clockwise direction.

During this movement, depicted by arrow 86, there is a pawl 90, similar to pawl 68, that is also pivotally mounted by a pin 92 to an appropriate bracket arrangement similar to brackets 72 and 74 which is mounted in conjunction with the hole 66. The pawl 90 is reversely positioned relative to the bracket 68 which is readily apparent when observing either FIG. 5 or FIG. 6. Pawls 68 and 90 actually comprise a clutch mechanism. There is to be incorporated with each pawl 68 and 90 a mechanism (not shown) to prevent the pawls 68 and 90 from "flipping over". Pivoting movement of each pawl 68 and 90 is limited to only a few degrees.

Referring particularly to FIG. 5, the force of water is applied against the sail 44 in the direction, as depicted by arrow 86. This will tend to move the sail 44 toward the left. The engaging surface 96 of the pawl 90 is grabbed by one of the pin-links 94 with the result that the chain 58 is moved in the direction of arrow 88. Since the chain 58 is continuous, the chain 58 will also move to the left at the bottom area of FIG. 5 and to the right at the top area of FIG. 5. This means that the chain 58 will actually slide on the guide trough 84 with a slippage occurring of the chain 58 relative to the cam surface 80 of the pawl 68. The sprockets 56 and 62 to which the chain 58 is engaged will then be rotated in a clockwise direction.

Figure 6:
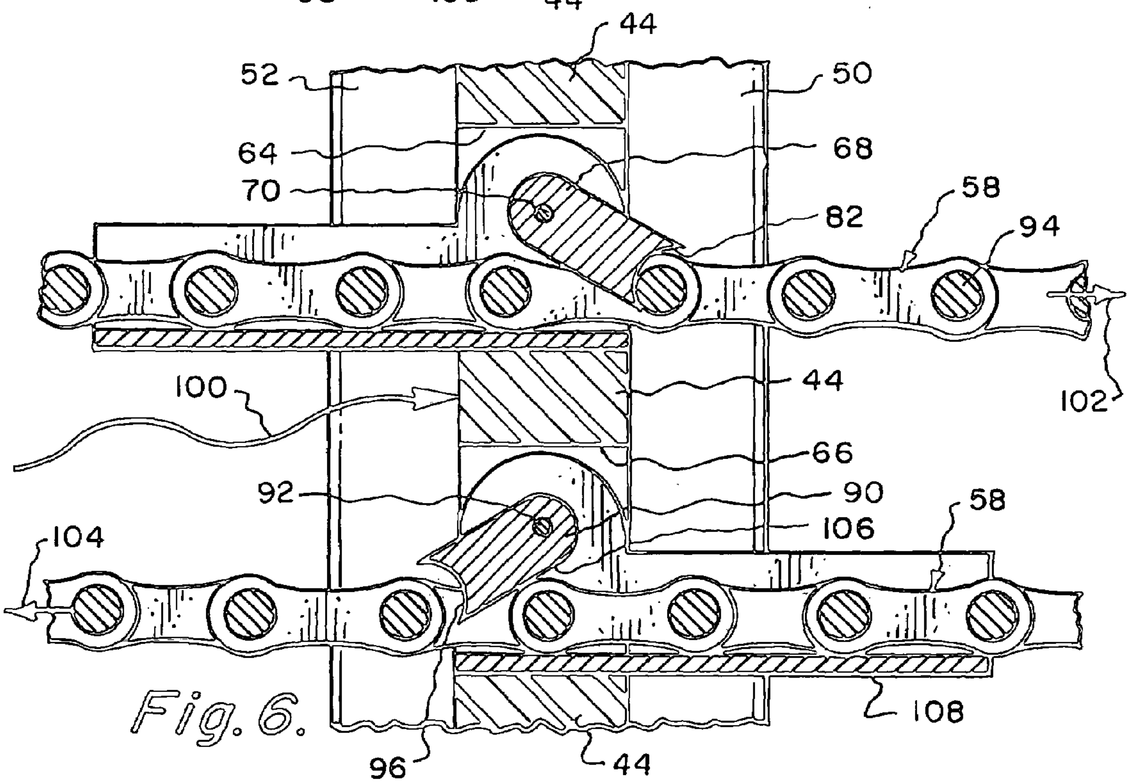
FIG. 6 is a view similar to FIG. 5 but showing the position of the clutch mechanism with the sail being driven in the rightward direction.

Referring particularly to FIG. 6, the force of the water is being exerted in the direction of arrow 100 against the sail 44. This will tend to move the sail 44 to the right in FIG. 6. One of the links 94 will come into contact with the engaging surface 82 of the pawl 68. This will mean that the chain 58 will be moved in direction of arrow 102 along with the movement of the sail 44. The chain 58 is also moved in the direction of arrow 104. At this particular time, the slippage will occur between the cam surface 106 of the pawl 90 with the result that the chain 58 will slide relative to guide trough 108. Again, the chain 58 is being moved in the same direction so that the output shaft 24 will again be driven clockwise.

It is necessary to keep the sail 44 from pitching when being moved in this reciprocal manner. In order to achieve that end result, there are four in number of guide rods 110 that are conducted through holes formed within the sail 44 with the ends of each guide rod 110 being fixed to a portion of the frame. The sail 44 will be constructed to be hollow. This will permit water to flow within the hollow cavity of the sail 44 so that the sail 44 will exhibit a minimal upward force due to flotation.

The torque converter 10 of the present invention intends to harness near-shore ocean energy to create an abundant, reliable and environmentally clean source of electricity. The conversion of wave energy directly into mechanical energy produces no harmful pollutant byproducts. The torque converter is built from non-corrosive, modern material and is entirely ocean friendly. It is estimated that a single unit of the torque converter 10 of this invention can produce electricity with a cost that is competitive with other forms of energy. Near-shore wave energy is a viable untapped energy resource. The torque converter 10 can be deployed in the surf zone under the level of the water. Due to the low profile, the torque converter 10 is mostly invisible to the public eye. Also, the torque converter 10 resides in an area where little or no environmental life exists and therefore will have minimal impact on the echosphere. The torque converter 10 is an unseen device that effectively harnesses energy from shore-line waves and produces no harmful by-products. The electricity that is produced by the torque converter 10 of this invention can be stored in battery fuel cells or connected directly to the electric grid. The output of the torque converter 10 could be used to hydrolyze and/or desalinate water.

What is claimed is:

1. A water torque converter for extracting energy from the reciprocal motion of water beneath waves in a body of water comprising:

a unit which has an open frame having an internal compartment;

a rigid sail mounted within said internal compartment, said rigid sail being capable of lineal movement along a path from one end of said frame to an opposite end of said frame, said sail having a front surface and a rear surface;

guide means mounted between said frame and said sail, said guide means functioning to confine said sail to establish said path of said lineal movement;

an output shaft;

an elongated driving member connected to said sail and said output shaft, whereby as said sail is moved along said path said driving member causes rotation of said output shaft; and said rigid sail being substantially planar on both said front surface and said rear surface with the exception that both said front surface and said rear surface has a raised peripheral edge.

2. A water torque converter for extracting energy from the reciprocal motion of water beneath waves in a body of water comprising:

a unit which has an open frame having an internal compartment;

a rigid sail mounted within said internal compartment, said rigid sail being capable of lineal movement along a path from one end of said frame to an opposite end of said frame, said sail having a front surface and a rear surface;

guide means mounted between said frame and said sail, said guide means functioning to confine said sail to establish said path of said lineal movement;

an output shaft;

an elongated driving member connected to said sail and said output shaft, whereby as said sail is moved along said path said driving member causes rotation of said output shaft; and a hole being formed through said sail, said elongated driving member connecting with said hole, said hole being substantially centrally located within said sail.

3. The water torque converter as defined in claim 2 wherein:

a clutch mechanism mounted on said sail, said clutch mechanism connecting with said elongated driving member, said clutch mechanism functioning to permit lineal movement of said elongated driving member in only a single direction.

4. A water torque converter for extracting energy from the reciprocal motion of water beneath waves in a body of water comprising:

a unit which has an open rigid frame having an internal compartment;

a rigid sail mounted within said internal compartment, said rigid sail being capable of lineal movement along a path from one end of said frame to an opposite end of said frame, said sail having a front surface and a rear surface;

guide means mounted between said frame and said sail, said guide means functioning to confine said sail to establish said path of said lineal movement;

an output shaft;

an elongated driving member connected to said sail and said output shaft, whereby as said sail is moved along said path said driving member causes rotation of said output shaft; and said rigid sail being substantially planar on both said front surface and said rear surface with the exception that both said front surface and said rear surface has a raised peripheral edge.

5. The water torque converter as defined in claim 4 wherein:

said guide means comprising a plurality of spaced apart elongated members on which said sail is mounted.

6. The water torque converter as defined in claim 5 wherein:

said elongated driving member being continuous.

7. The water torque converter as defined in claim 6 wherein:

said elongated driving member comprising a chain.

8. The water torque converter as defined in claim 7 wherein:

said output shaft being spaced from said frame.

9. The water torque converter as defined in claim 8 wherein:

a hole being formed through said sail, said elongated driving member connecting with said hole, said hole being substantially centrally located within said sail.

10. The water torque converter as defined in claim 9 wherein:

a clutch mechanism mounted on said sail, said clutch mechanism connecting with said elongated driving member, said clutch mechanism functioning to permit lineal movement of said elongated driving member in only a single direction.

11. The water torque converter as defined in claim 10 wherein:

there being another said unit being connected to said output shaft with both said units causing rotation of said output shaft.

* * * * *